United States Patent [19]

Kimura

[11] 4,202,030  
[45] May 6, 1980

[54] ILLUMINATION DEVICE FOR MOTOR VEHICLES

[75] Inventor: Masayuki Kimura, Nagoya, Japan

[73] Assignee: Toyota Jidosha Kogyo Kabushiki Kaisha, Toyota, Japan

[21] Appl. No.: 874,874

[22] Filed: Feb. 3, 1978

[30] Foreign Application Priority Data

Feb. 7, 1977 [JP] Japan .......................... 52/013422[U]

[51] Int. Cl.² .............................................. B60Q 1/12
[52] U.S. Cl. ...................................... 362/61; 362/144; 362/226; 362/258
[58] Field of Search .................. 362/61, 125, 128, 135, 362/136, 138, 144, 140, 143, 156, 127, 133, 134, 226

[56] References Cited

U.S. PATENT DOCUMENTS

| | | | |
|---|---|---|---|
| 2,001,743 | 5/1935 | Morrison | 362/144 |
| 2,149,597 | 3/1939 | Girl et al. | 362/144 |
| 2,149,598 | 3/1939 | Girl et al. | 362/144 |
| 3,926,470 | 12/1975 | Marcus | 362/61 |
| 4,075,468 | 2/1978 | Marcus | 362/144 |
| 4,091,443 | 5/1978 | Ohrenstein | 362/140 |

Primary Examiner—Benjamin R. Padgett
Assistant Examiner—J. L. Barr
Attorney, Agent, or Firm—Koda and Androlia

[57] ABSTRACT

An illumination device for motor vehicles which include a floor mounted console provided within the passenger compartment. The illumination device includes a case having an opening therein and which is detachably provided in the console so that the case can be easily installed and removed from the console, a lamp provided in the case adjacent to the opening and a long flexible power cord electrically coupled to the lamp and to a source of power such that the illumination device can be removed from the console and utilized at various locations within the passenger compartment. The lamp, case opening and console is further arranged and configured such that when the illumination device is installed in the console, the illumination device illuminates an instrument panel of the motor vehicle without casting light on the windshield of the motor vehicle.

7 Claims, 7 Drawing Figures

ILLUMINATION DEVICE FOR MOTOR VEHICLES

BACKGROUND OF THE INVENTION

1. Field of the Invention

This invention relates to illumination devices for motor vehicles and more particularly to multi-purpose illumination devices provided in a floor mounted console in the motor vehicle.

2. Prior Art

In motor vehicles there are generally required many different illumination functions within the interior of the motor vehicle. Such interior illumination requirements include overall illumination of the interior by means of a dome lamp while the motor vehicle is stopped and partial illumination for illuminating various items of equipment provided on the instrument panel, i.e., stereo equipment, etc., or for illuminating such things as books, maps, etc., being referred to by a person other than the driver while the motor vehicle is in motion. Examples of conventional interior illumination devices which perform the partial illumination function are spot lamps, personal lamps, map lights, etc. provided in various places within the passenger compartment. However, since spot lamps or personal lamps are ordinarily rigidly fixed to an interior overhead console or to the roof of the motor vehicle passenger compartment, it is sometimes difficult to appropriately illuminate the various items of equipment mounted in the instrument panel. Furthermore, many map lights are fastened to the instrument panel by means of a flexible supporting column. Therefore when the lamp is not in use, the flexible supporting column interferes with the operation of various other items of equipment of the motor vehicle. Furthermore, all of the above described lamps suffer from other drawbacks. These drawbacks include that the lamps provided forward of the front seat cannot be used by passengers in the rear seats and cannot be used to illuminate the luggage space in hatchback automobiles, which have recently been increasing in popularity.

In order to overcome the above drawbacks and meet the above-described requirements, it would be necessary to provide illumination devices throughout the whole interior of the automobile. Such a solution is undesirable from the standpoint of economization of resources and since it increases the cost of manufacture.

SUMMARY OF THE INVENTION

Accordingly, it is the general object of the present invention to provide a single multi-purpose illumination device for the passenger compartment of a motor vehicle.

It is still another object of the present invention to provide a single multi-purpose illumination device which is relatively low in cost.

In keeping with the principles of the present invention the objects are accomplished by a unique illumination device for motor vehicles which includes a floor mounted console provided within the passenger compartment. The illumination device includes a case having an opening provided therein and which is detachably provided within the console such that the case can be easily installed and removed from the console, a lamp provided in the case adjacent to the opening and a long flexible power cord electrically coupled to the lamp and to a source of power such that the illumination device can be easily removed from the console and utilized at various locations in the passenger compartment. The lamp, case, opening and console is further arranged and configured such that when the illumination device is installed in the console, the illumination device illuminates an instrument panel of the motor vehicle without casting light on a windshield of the motor vehicle.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
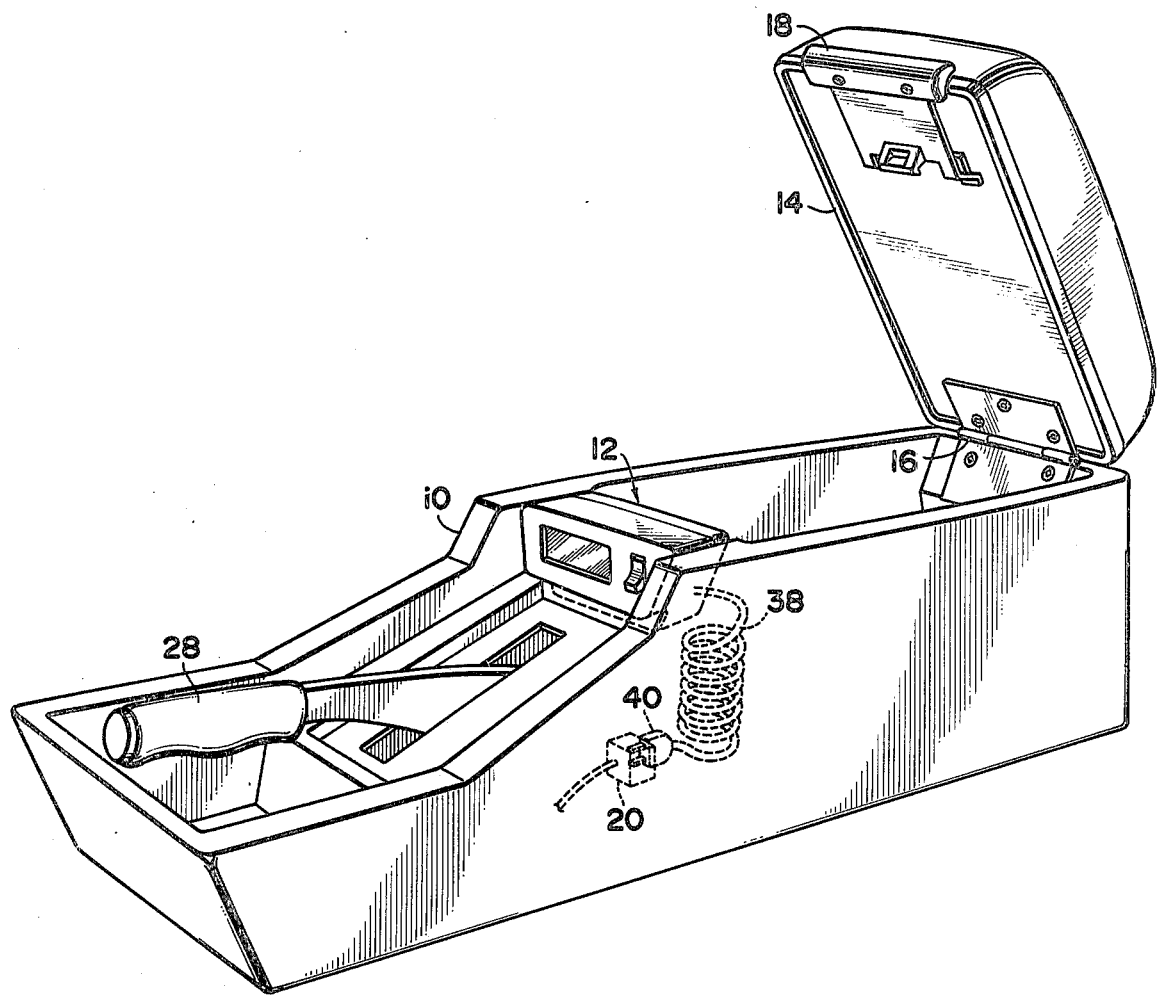
FIG. 1 is an oblique view of a floor mounted console for a motor vehicle equipped with illumination device in accordance with the teachings of the present invention.
Figure 2:
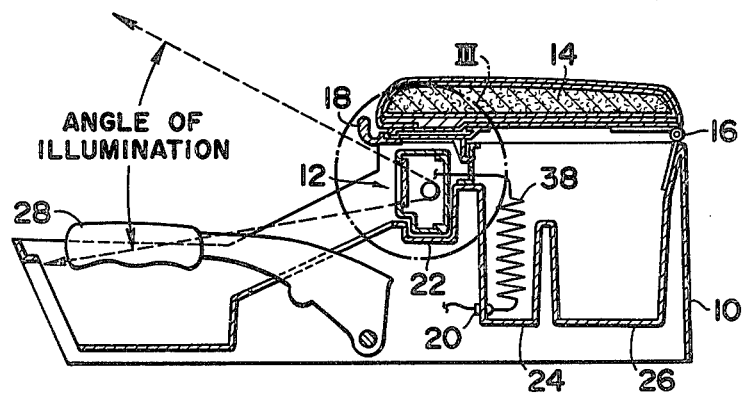
FIG. 2 is a longitudinal cross-section of the embodiment of FIG. 1.
Figure 3:
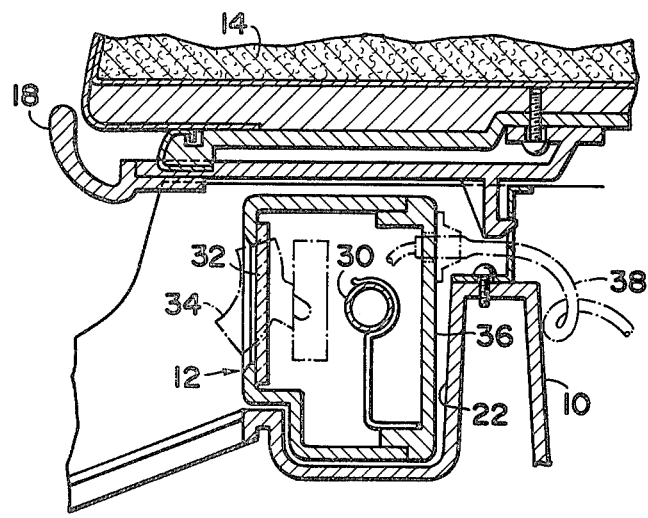
FIG. 3 is an enlarged view of the area marked III in FIG. 2.

Referring more particularly to the drawings, shown in FIGS. 1 through 3 is one embodiment of illumination device in accordance with the teachings of the present invention. In the Figures a floor mounted console 10 is provided within the passenger compartment of the motor vehicle and a multi-purpose illumination device 12 is provided in the upper front portion of the floor console box 10 in such a manner that it can be easily installed and removed from the console 10. The console 10 includes a cover 14 which is joined to the console 10 so that it can freely rotate relative to the box 10 by a hinge 16. The console 10 is further provided with a lock 18 for securing the cover 14 to the console 10. A plug socket 20 is provided within the console 10 and for the purpose of supplying power from the motor vehicle battery to the illumination device 12.

As shown in FIG. 2, a recepticle 22 for the illumination device 12, a receptacle for power cord 38 for the illumination device 12 and a storage space 26 are formed within the floor mounted box console 10. In addition an emergency brake lever 28 extends through an opening in the console 10.

As shown in FIG. 3, the cover 14 of the console 10 is formed so that it projects forward of the console 10. Accordingly, when the cover 14 is closed, light from the illumination device 12 when it is mounted within the floor mounted console box 10 will not cast light onto the front windshield of the motor vehicle.

Figure 4:
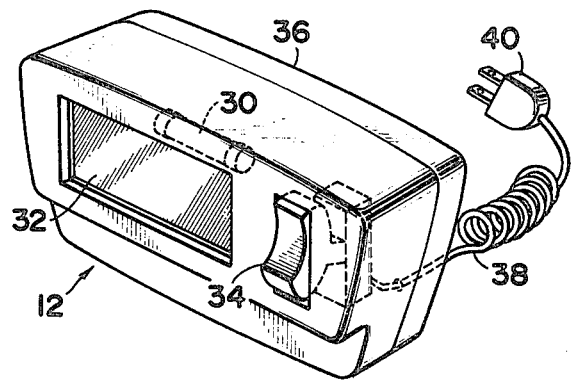
FIG. 4 is an oblique view of an illumination device of FIG. 1.

As shown in FIG. 4, the illumination device 12 includes a case 36 which is typically made of for example plastic. A tubular lamp 30 which acts as a light source is provided within the case 36. A clear lens 32 for the purpose of directing light from the lamp 30 toward the instrument panel is provided in an opening in the case 36. An on-off switch 34 for controlling the operation of the lamp 30 is further provided in the case 36. A cord 38 of approximately 2.5 meters in length (for example) which allows the multi-purpose illumination device 12 to be freely moved about when it is removed from the console box 10 is coupled to the lamp 30 and the switch 34 at one end and to a plug 40 at the other end which engages with the plug socket 20 provided within the console 10.

Figure 5A:
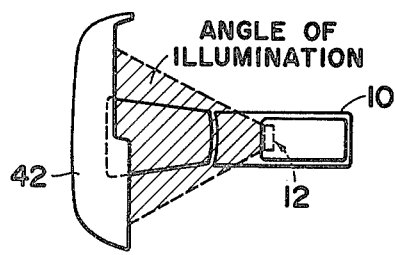
FIGS. 5a and 5b are rough illustrations showing the illumination of the instrument panel by means of an illumination device in accordance with the teachings of the present invention.
Figure 5B:
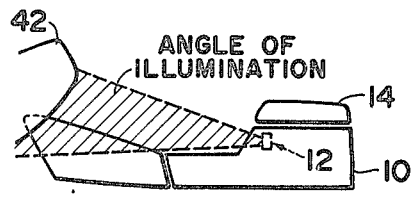

In operation, as shown in FIGS. 5a and 5b, the multi-purpose illumination device 12 is provided in such a position and at such an angle in the console 10 such that it illuminates the lower portion of the instrument panel 42 when the illumination device 12 is mounted or installed in the console 10. Accordingly, the illumination device 12 does not interfere with the vision of the driver while the vehicle is in motion and principle items of equipment such as stereo equipment can be easily illuminated by the illumination device so that operation of this equipment is facilitated.

In addition since the illumination device 12 is provided in the console 10, it is also possible to effectively illuminate not only various items of equipment mounted in the instrument panel, but also the interior of a glove box compartment provided in the instrument panel. Furthermore since the illumination device 12 can be easily removed from the console 10, it can be easily used by the driver, a passenger sitting next to the driver and also by passengers sitting in the rear seat of the motor vehicle.

Figure 6:
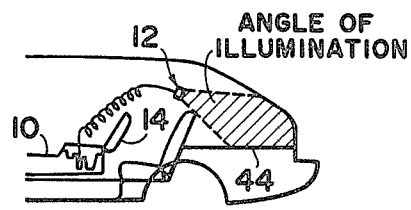
FIG. 6 is a rough illustration showing the illumination of the luggage space in a hatchback automobile by means of an illumination device in accordance with the teachings of the present invention.

As shown in FIG. 6, since the illumination device is connected to a source of power by a relatively long cord 38, it would be possible to remove the illumination device 12 from the console 10 and utilize it to illuminate the luggage space 44 in a hatchback automobile.

It should also be apparent to one normally skilled in the art that various other modifications and arrangements could be made with the illumination device 12 without departing from the spirit and scope of the invention. Such modifications include:

(1) Since the illumination device 12 is connected to a power source by a plug 20, it would be possible to provide power source plug sockets at other places within the motor vehicle such as the engine space and the trunk so that the plug 40 of the illumination device could be plugged into these additional power source plug sockets and utilized to illuminate other areas of the motor vehicle;

(2) The illumination device 12 could be made cordless by the use of dry cells or a rechargeable battery; if a rechargeable battery is utilized, it would be possible to provide a charging device within the console 10 and recharge the battery of the illumination device 12 when it is installed in the console 10;

(3) The illumination device could be mounted in the console 10 such that the angle of illumination of the illumination device 12 could be varied in both the vertical and lateral direction; such a variable angle illumination device would allow the driver to adjust the angle of illumination so that any disturbance to the driver caused by the illuminating light could be greatly minimized if the necessity arose;

(4) A removable red filter could be provided on the lens of the illumination device 12 so that it could be utilized as an emergency signaling lamp.

As described above, this invention provides an illumination device which can be easily installed and removed in a floor mounted console of a motor vehicle and which when mounted in the console would illuminate the instrument panel of the motor vehicle and thereby facilitate the operations of various items of equipment provided on the instrument panel when it is dark. Furthermore, if the illumination device is removed from the console box, it can be used not only by passengers in the front seat but also by passengers in the back seat for a great variety of purposes i.e., illumination while looking at road maps, illumination of the luggage space in a hatchback automobile, illumination of the interior of the glove box, etc.

It should be apparent to one skilled in the art that the above-described embodiment is merely illustrative of but one of many possible specific embodiments which represent the applications of the present invention. Numerous and varied other arrangements can be readily devised by those skilled in the art without departing from the spirit and scope of the invention.

I claim:

1. An illumination device for motor vehicles which include a floor mounted console provided within the passenger compartment, said illumination device comprising:

three receptacles provided in said console;

a case having an opening therein and which is detachably provided in a front recepticle of said three receptacles of said console so that said case can be easily installed and removed from said console;

a lamp provided in said case adjacent to said opening;

a portable source of power for said lamp whereby said illumination device can be easily removed from said console and utilized in various location within said passenger compartment; and a box cover hingeably coupled to said console, said cover extending over said three recepticles such that when said illumination device provided in said front receptacle, said illumination device illuminates an instrument panel of said motor vehicle and said cover prevents said illumination device from casting light onto a windshield of said motor vehicle.

2. An illumination device for motor vehicles which include a floor mounted console provided within the passenger compartment, said illumination device comprising:

a case having an opening therein and which is detachably provided in said console so that said case can be easily installed and removed from said console;

a lamp provided in said case adjacent to said opening; and a long flexible power cord electrically coupled to said lamp and to a source power whereby said illumination device can be removed from said console and utilized in various locations within the passenger compartment, said lamp, case opening and console further being arranged and configured such that when said illumination device is installed in said console, the illumination device illuminates an instrument panel of said motor vehicle without casting light onto a windshield of said motor vehicle.

3. An illumination device according to claim 2 wherein said console is provided with three receptacles and said illumination device is provided in a front receptacle of said three receptacles.

4. An illumination device according to claim 3 wherein a central receptacle of said three receptacles is used for said power cord and a plug is provided on said power cord and a plug socket for receiving said plug of said power cord is provided in said central receptacle.

5. An illumination device according to claim 3 further including a cover hingeably coupled to said console and covering said three receptacles.

6. An illumination device according to claim 2 wherein said illumination device is provided with an on-off switch for turning on and off said lamp.

7. An illumination device according to claim 2 wherein said illumination device is fully received within said console and does not project out of said console.

* * * * *